Jan. 19, 1965    G. KIPER ETAL    3,165,996
COMBINED SHUTTER AND DIAPHRAGM ASSEMBLY FOR CAMERAS
Filed Sept. 29, 1960    7 Sheets-Sheet 1

INVENTOR.
RUDOLF KREMP
GERD KIPER
BY
Michael S. Striker
Attorney

Jan. 19, 1965  G. KIPER ETAL  3,165,996
COMBINED SHUTTER AND DIAPHRAGM ASSEMBLY FOR CAMERAS
Filed Sept. 29, 1960  7 Sheets-Sheet 2

Fig.3

INVENTOR.
RUDOLF KREMP
GERD KIPER
BY

Jan. 19, 1965     G. KIPER ETAL     3,165,996
COMBINED SHUTTER AND DIAPHRAGM ASSEMBLY FOR CAMERAS
Filed Sept. 29, 1960     7 Sheets-Sheet 3

INVENTOR.
RUDOLF KREMP
BY   GERD KIPER

Michael S. Striker
Attorney

Fig. 6

Jan. 19, 1965  G. KIPER ETAL  3,165,996
COMBINED SHUTTER AND DIAPHRAGM ASSEMBLY FOR CAMERAS
Filed Sept. 29, 1960  7 Sheets-Sheet 5

INVENTOR.
RUDOLF KREMP
GERD KIPER
BY
Michael S. Striker
Attorney

Jan. 19, 1965   G. KIPER ETAL   3,165,996
COMBINED SHUTTER AND DIAPHRAGM ASSEMBLY FOR CAMERAS
Filed Sept. 29, 1960   7 Sheets-Sheet 6

INVENTOR.
RUDOLF KREMP
GERD KIPER
BY

INVENTOR.
RUDOLF KREMP
GERD KIPER

United States Patent Office 3,165,996
Patented Jan. 19, 1965

3,165,996
COMBINED SHUTTER AND DIAPHRAGM
ASSEMBLY FOR CAMERAS
Gerd Kiper, Unterhaching, near Munich, and Rudolf
Kremp, Munich, Germany, assignors to Agfa Aktiengesellschaft, Leverkusen-Bayerwerk, Germany
Filed Sept. 29, 1960, Ser. No. 59,270
Claims priority, application Germany, Oct. 3, 1959,
A 32,984
15 Claims. (Cl. 95—64)

The present invention relates to cameras.

More particularly, the present invention relates to the shutter and diaphragm structure of a camera as well as the structure for controlling the shutter and diaphragm.

At the present time it is conventional to provide cameras with a shutter assembly and a diaphragm assembly both of which are completely independent units requiring their own space and of course making it necessary to provide a camera which is large enough to accommodate both the shutter assembly and the diaphragm assembly. Furthermore, the provision of both a shutter assembly and a diaphragm assembly necessitates a complex series of elements for controlling both the shutter assembly and the diaphragm assembly.

One of the objects of the present invention is to provide a camera wherein a single unit will perform both the function of the shutter as well as the function of the diaphragm.

Another object of the present invention is to provide a camera wherein the single unit which acts as both shutter and diaphragm provides for each aperture a proper exposure time in a fully automatic manner.

A further object of the present invention is to provide a structure of the type referred to above wherein the exposure time is controlled by a structure which does not require any of the timing mechanisms of the type which are used in conventional cameras.

It is also an object of the present invention to provide a structure which is exceedingly simple and compact and which at the same time is inexpensive and very reliable in operation while also being capable of automatic operation.

It is also an object of the present invention to provide a single assembly capable of performing the function of both a shutter and a diaphragm and at the same time being easily adapted for use either with manually adjustable cameras, with cameras which automatically operate from light meters or the like, or also being capable of use when the camera is operated under flash operation.

The objects of the present invention also include the provision of a structure of the above type which can easily be adapted for use with all types of shutter cocking and releasing structures.

With the above objects in view the present invention includes in a camera a blade means which is located substantially in a plane normal to the optical axis of the camera. A ring means cooperates with this blade means for moving the latter from a closed position where the blade means prevents an exposure from being made to an open position where an exposure will be made and then back to the closed position. A control means according to the present invention cooperates with the ring means to actuate the same to open the blade means to an extent which diminishes as the light intensity increases and to maintain the blade means in its open position also to an extent which diminishes as the light intensity increases.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
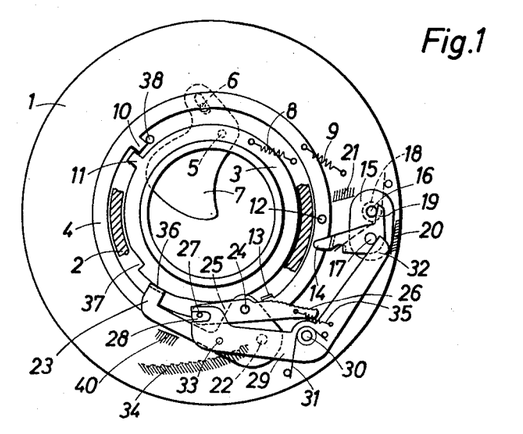
FIG. 1 is a schematic illustration of one embodiment of a structure according to the present invention.

Referring now to the drawings, and more particularly to FIG. 1, there is shown therein a shutter housing 1 provided with a tubular member 2 whose axis coincides with the optical axis and which serves to support rotary elements such as the leading ring means 4 and the trailing ring means 3 for rotation about the optical axis, the tubular support 2 being provided with suitable cutouts for the various elements which pass through the wall of the tube 2, in the manner shown in FIG. 1. Thus, it will be seen that the leading ring 4 surrounds the tube 2 and is guided by the latter for rotation while the trailing ring 3 is located within the tube 2 and also is guided by the latter for rotation. The leading ring 4 fixedly carries a plurality of pins 6, while the trailing ring 3 fixedly carries a plurality of pins 5. A plurality of shutter blades 7, only one of which is shown for the sake of clarity, are respectively pivotally supported by the pins 5 and are formed with slots through which the pins 6 respectively extend. The blade 7 is shown in FIG. 1 in the position it has when the combined shutter and diaphragm of the invention is in its closed position. It will be noted that the blade 7 together with the remaining unillustrated blades form a blade means which is located substantially in a plane which is normal to the optical axis. In the position shown in FIG. 1 this blade means is closed so as to prevent an exposure. However, it is clear that when one of the rings 3 and 4 turns with respect to the other from the position shown in FIG. 1 the several blades will turn so as to open the blade means and provide an exposure.

A spring means is provided for maintaining the leading and trailing ring means 4, 3 in the rest position illustrated in FIG. 1, and this spring means includes a spring 8 which urges the ring 3 in a clockwise direction, as viewed in FIG. 1, and a spring 9 which urges the ring 4 in a clockwise direction, as viewed in FIG. 1. The leading ring 4 has an inwardly directed projection 10 engaging a stationary stop pin 38 carried by the support formed by the housing 1, so as to determine the rest position of the ring 4, the spring 9 maintaining the projection 10 in engagement with the stop 38. The ring 3 has an outwardly directed projection 11 engaging the projection 10 so that in this way the position of the ring 3 when it is in its position of rest is also determined, it will be noted that in this position the blade means 7 is closed.

In addition it will be noted that the ring 4 is provided with a pin 12 and a lug 13.

A manually operable means is provided for first cocking and then releasing the combined shutter and diaphragm of the invention, and this manually operable means includes the bell crank 14 which engages directly with the pin 12 in a manner described below. This bell crank 14 is pivotally carried by the manually turnable actuating lever 15 which is manually turned by the operator through an unillustrated motion transmitting structure accessible to the operator and not shown for the sake of clarity. The manually turnable lever 15 carries a pivot pin 17 on which the bell crank 14 is supported for turning movement, and the bell crank 14 in the position shown in FIG. 1 engages the stationary pin 16 about which the lever 15 is guided for pivotal movement. A spring 18 is coiled around the pin 16, has one end engaging a stationary pin and has its other end engaging a lug of the lever 14, so that this spring 18 acts through the lever 14 on the lever 15 to urge the latter as well as the lever 14 to the rest position shown in FIG. 1. This rest position is determined by a stationary stop 20 which is engaged by the lever 15, as illustrated in FIG. 1, and the extent of turning movement of the lever 15 away from the stop 20 is limited by a second stop 21. The lever 14 has an edge 19 which directly engages the stationary pivot pin 16 which pivotally supports the lever 15.

Figure 2:
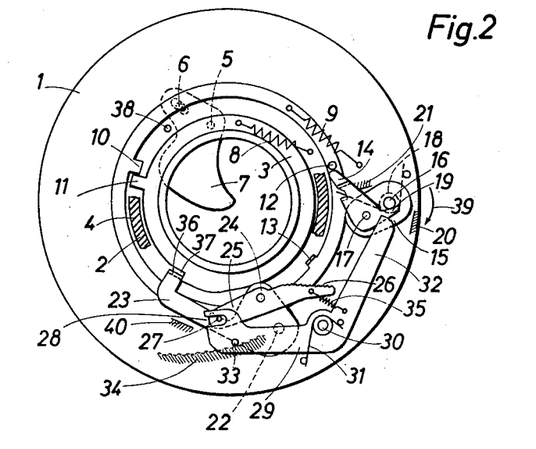
FIG. 2 shows a structure of FIG. 1 in a position different from that illustrated in FIG. 1.

In accordance with the present invention there is provided an aperture lever means 25 which will determine the extent to which the blades move from their closed position, in a manner described below. This aperture-determining lever 25 is pivotally supported by a pivot pin 24 which is in turn carried by a holding lever means 23 which is supported by the stationary pivot pin 22 which is carried by the shutter housing 1. The holding lever means 23 thus turns about the pivot 22 and acts in a manner described below to hold the trailing ring 3 against turning so as to allow the blades to move to their open position. The aperture lever means 25 is provided with a camming edge formed by a series of steps 26, so that this forms a stepped edge portion of the lever 25, and in addition the lever 25 carries a pin 27 which extends into a slot or notch 28 formed in a setting lever means 29. This setting lever means 29 is pivotally supported by a stationary pin 30 which is carried by the shutter housing 1. A spring 31 is coiled about the pin 30, presses with one end against a pin which is carried by the lever 29 to the right of the pin 30, as viewed in FIGS. 1 and 2, and the other end of the spring 31 engages a stationary pin as illustrated in FIGS. 1 and 2, so that the spring 31 urges the lever 29 to turn in a counterclockwise direction, as viewed in FIGS. 1 and 2, about the pin 30. In the position of the parts shown in FIG. 1, the setting lever means 29 directly engages the pin 17 of the manually operable means which is actuated by the operator for cocking and releasing the combined shutter and diaphragm. The lever 29 also carries a pin 33 which cooperates with the camming edge 34 of an adjustable means capable of being manually adjusted to provide a selected light value. The structure for setting the cam 34 is not illustrated for the sake of clarity. Any suitable manually turnable ring may be provided for determining the angular position of the cam 34 according to a given light value which will provide a predetermined combination of exposure time and aperture, as described below. A spring 35 is connected at one end to the lever 25 and at its opposite end to the lever 29 to urge these levers to move in a predetermined manner with respect to each other, this spring 35 being under tension.

The holding lever 23 is provided at its left free end, as viewed in FIGS. 1 and 2 with a lug 36 which extends across the outer periphery of the trailing ring 3, and this ring 3 is provided with a notch 37 which forms the ring 3 at its periphery with a projection adapted to cooperate with the lug 36 of the lever 23. As is apparent from FIG. 1, the spring 35 acts through the lever 25 on the lever 23 to urge the lug 36 against the periphery of the ring 3. When the ring 3 is turned in a counterclockwise direction during cocking of the structure the projection 36 will move into the notch 37 to the position shown in FIG. 2 for releasably holding the ring 3 against return movement by the spring 8.

When the above-described structure is operated, the operator turns the lever 15 in the direction of the arrow 39 of FIG. 2. In this way the lever 14 will be placed in engagement with pin 12 and will thus turn the ring 4 in opposition to the spring 9 in a counterclockwise direction, as viewed in FIGS. 1 and 2. The ring 4 by way of its projection 10 will act on the projection 11 so as to turn the ring 3 in opposition to the spring 8 also in a counterclockwise direction, and since the rings 3 and 4 do not at this time turn one with respect to the other, the shutter blades remain in their closed position. This cocking movement of the structure continues until the tip of the lever 14 rides off the pin 12. The lever 14 is shown in FIG. 2 in the position it takes just before the tip of the lever 14 rides off the pin 12. It will be noticed that at this time the lug 36 has entered into the notch 37 under the force of the spring 35. Moreover, during turning of the levers 14 and 15 in direction of the arrow 39 of FIG. 2, the spring 31 has acted on the lever 29 so as to turn the latter in a counterclockwise direction about the pin 30, and the arm 32 of this lever 29 follows the pin 17 until the pin 33 engages the cam 34 to stop the turning of the lever 29 by the spring 31 while the pin 17 continues to turn with the levers 14 and 15. Thus, the setting of the cam 34 will determine the angle which the setting lever means 29 takes during cocking of the structure of FIGS. 1 and 2, and this angular position of the lever 29 will determine through the spring 35 and through cooperation of the pin 27 with the notch 28 to the angular position of the aperture lever means 25. It will be seen that with this arrangement a particular step of the stepped edge portion 26 of the lever 25 will be located in the path of turning movement of the projection 13 of the leading ring 4. The angular position to which the lever 25 is moved with the above-described structure before the lever 14 moves away from the pin 12 just beyond the position shown in FIG. 2 will determine both the size of the exposure aperture and the exposure time.

Figure 3:
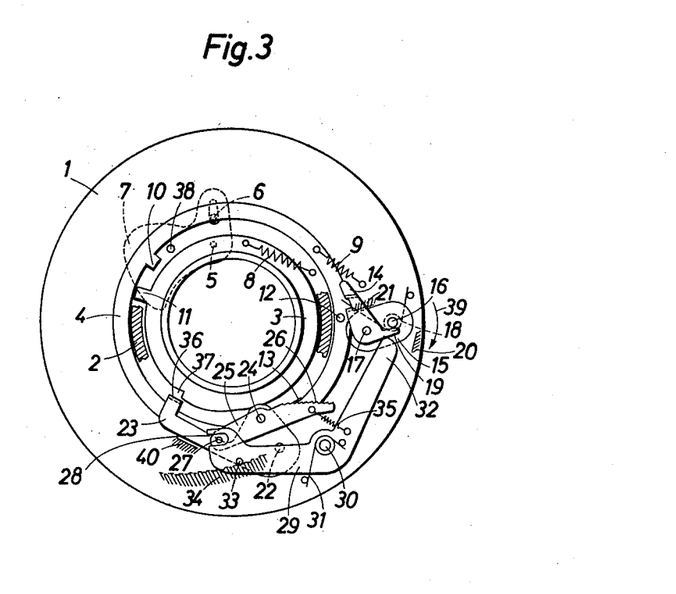
FIG. 3 shows the structure of FIGS. 1 and 2 in a still further position different from that of FIGS. 1 and 2.

After the lever 14 rides off the pin 12, the spring 9 acts on the leading ring 4 to turn the latter in a clockwise direction, and thus the projection 13 approaches the stepped edge portion 26 of the lever 25. At this time, however, the ring 3 remains stationary since it is held by the holding lever means 23, and thus the leading ring 4 turns with respect to the trailing ring 3 and the blades 7 are turned so that the blade means is moved from its closed position to an open position. When the structure is thus released, the spring 9 will urge the ring 4 back toward the rest position where the projection 10 engages the stop 38, but the ring 4 does not reach this position since the projection 13 first engages the stepped edge portion 26 of the lever 25, as indicated in FIG. 3. The configuration of the steps of the stepped edge portion 26 is such that when the projection 13 engages one of these steps the force provided by the spring 9 acts through the lever 25 and the pivot pin 24 on the lever 23 to exert a turning moment which turns the lever 23 in a counterclockwise direction about the pin 22, and thus the impact between the projection 13 and the lever 25 causes the lever 23 to be turned from the position of FIG. 2 to the position of FIG. 3 where the lug 36 is no longer in the notch 37 and thus spring 8 can now turn the trailing ring 3 in a clockwise direction, as viewed in FIG. 3. However, it will be noted that at this time the ring 4 is still blocked by cooperation of the projection 13 with the lever 25, so that the ring 4 remains stationary while the spring 8 acts to turn the ring 3 until the projection 11 engages the projection 10. Thus, the shutter will be closed at this time. When the lever 23 turns away from the ring 3, this lever 23 engages a stop 40 which guarantees that the lever 25 remains in the position blocking further turning of the ring 4.

It will be seen that when the structure is fully cocked, which is to say when the lever 14 rides off the pin 12, the spring 9 would have been tensioned to a predetermined degree. This force of the spring 9 is expended to a certain extent in the movement of the ring 4 until the projection 13 engages the lever 25. If a relatively large opening is provided a considerable amount of the force of the spring 9 will have been used in moving the ring 4 and the blades 7, so that a relatively small amount of force will remain for moving the lever 23 away from its position holding the ring 3 against turning by the spring 8, and thus the lever 23 will be moved with a relatively slow speed away from its holding position, so that with relatively large openings relatively large exposure times are provided. On the other hand, if the projection 13 moves through only a short distance before engaging the lever 25, to provide only a small exposure aperture, there is still a very considerable amount of force remaining in the spring 9, so that the force moving the lever 23 away from its holding position is considerable and at this time the lever 23 is moved quite rapidly away from the ring 3, so that with small openings small exposure times are provided. With the structure of the invention there is a predetermined exposure time for each aperture, and as the aperture size is increased the exposure times also increase so that the exposure time and aperture vary proportionately with respect to each other.

After an exposure has been made the spring 18 returns the lever 15 to its rest position in engagement with the stop 20. The bell crank 14 can turn past the pin 12 due to the pivotal mounting of the bell crank 14 through the pin 17 on the lever 15. During the return movement of the lever 15, the pin 17 thereof engages the arm 32 of the lever 29 and returns this latter lever to its rest position shown in FIG. 1. As a result the lever 29 exerts a further tension of the spring 35 which now acts on the lever 25 to turn the latter in a clockwise direction, as viewed in the drawings, and in this way the edge portion 26 of the lever 25 is moved beyond the path of turning of the projection 13. Thus, at this time the leading ring 4 can be returned by the spring 9 to the rest position shown in FIG. 1, and of course the ring 3 turns with the ring 4, so that the shutter, diaphragm blades 7 remain in their closed position.

As is apparent from the above description, the above-described structure provides with a single blade means located in a single plane which is normal to the optical axis both a predetermined exposure aperture and a predetermined exposure time. For example, when the structure has been set for an extremely low light value, such as, for example, value 9, then the lever 29 will be turned to such a small extent that only the first tooth of the series of teeth 26 will be located in the path of turning of the projection 13, and as a result the spring 9 turns the ring 4 through an angle which is extremely large, and thus a very large opening is provided. Of course, the length of time required for this action to take place also provides a longer exposure time. At higher light values the trailing ring 3 will be released when the blades have only moved through a fraction of the angle they move through for large exposure apertures, so that this will also result in a shorter exposure time. It should be noted that the exposure time is determined not only by the extent to which the parts move but also by the spring forces, as was described above. Thus, at relatively small apertures, which is to say, relatively small extents of movement of the blades 7 from their closed position, the spring 9 has a large residual force and therefore acts with this larger force on the lever 23, so that not only do the parts move through lesser distances but they also move quicker in order to provide shorter exposure times.

Figure 9:
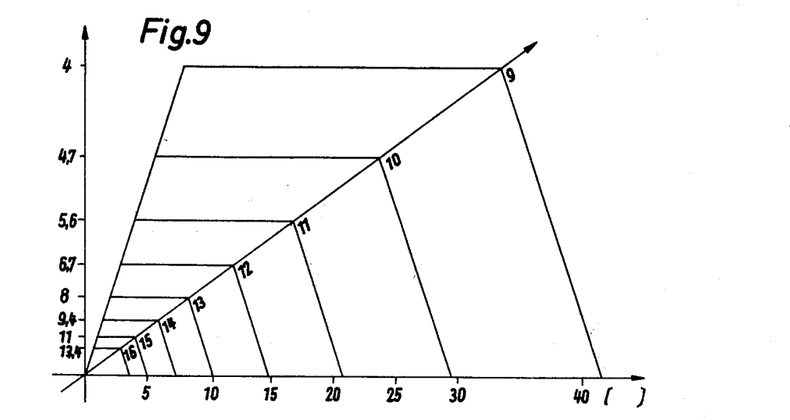
FIG. 9 graphically illustrates the various combinations of exposure time and exposure aperture provided for various light values.

FIG. 9 graphically illustrates the various combinations of exposure apertures with exposure times, in milliseconds, for the light values 9–16 for a film which has a speed of 18 DIN. Thus, as is apparent from FIG. 9, with increasing light values, which is to say with increase in light intensity, both the exposure time and the exposure aperture will decrease with the structure of the invention.

Figure 4:
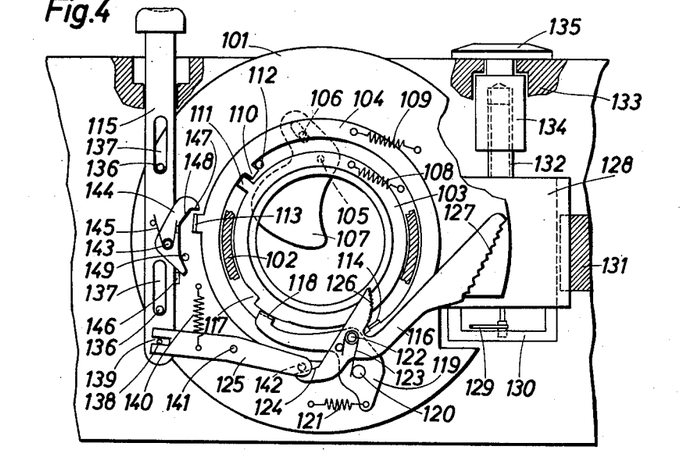
FIG. 4 diagrammatically illustrates another embodiment of a structure according to the present invention.

In the embodiment of FIGS. 1–3, the cam 34 is manually adjustable to a preselected light value. FIG. 4 illustrates an embodiment of the invention where the light intensity is automatically sensed and where the structure operates automatically to provide the proper combination of exposure time and exposure aperture. Thus, referring to FIG. 4 it will be seen that the housing 101 carries the tubular member 102 which supports the leading ring 104 and the trailing ring 103 for turning movement in the manner described above in connection with FIGS. 1–3. These rings carry the pins 105 and 106 which cooperate with the blades 107 also in the manner described above. A spring means urges the rings 103 and 104 to the rest position illustrated in FIG. 4, and this spring means includes the spring 108 acting on the trailing ring 103, and the spring 109 which acts on the leading ring 104. The ring 104 has the inwardly directed projection 110 engaging the stationary pin 112 so as to determine the rest position of the ring 104, and the trailing ring 103 has an outwardly directed projection 111 engaging the projection 110 so as to determine the rest position of the ring 103. The leading ring 104 has a projection 114 which extends parallel to the optical axis, as well as a second projection 113 also extending parallel to the optical axis.

A manually operable plunger 115 is supported for vertical movement and is accessible to the operator for the purpose of cocking and releasing the structure in the manner described below. The plunger 115 acts in a manner described below through the pawl 144 on the projection 113 for cocking the structure, while the projection 114 cooperates with the stepped edge portion 126 of the aperture lever means 116 of the embodiment of FIG. 4 for determining the size of the aperture. The trailing ring 103 is formed with a cutout 117 into which a lug 118 of a holding lever means 119 of the embodiment of FIG. 4 is adapted to be moved by the action of a spring 121 which acts on the lever 119 to turn the latter in a clockwise direction about the pivot pin 120 which supports the lever 119 for turning movement, this pivot pin 120 being carried by the housing 101. The holding lever means 119 fixedly carries a pivot pin 122 on which the aperture lever means 116 is turnable. A spring 123 is coiled about the pin 122, has one end engaging the stationary pivot 120, and with its other end engages the pin carried by the lever 116 to urge the latter to turn in a clockwise direction, as viewed in FIG. 4, about the pivot 122.

The aperture lever means 116 has an edge portion 124 which engages a pin 142 carried by a lever 125 which is supported for turning movement by stationary pivot pin 141, a spring 140 acting on the lever 125 to urge the latter to turn in a clockwise direction to the position illustrated in FIG. 4. This lever 125 serves to transmit movement of the plunger 115 to the lever 116, and for this purpose the lever 125 is formed with an elongated notch 139 which receives the pin 138 which is fixed to the plunger 115. The aperture lever means 116 includes in addition to the stepped edge portion 126 a stepped edge portion 127 which cooperates with the light meter structure in the manner described below.

The light meter 128 may take the form, for example, of a galvanometer which is energized from a photocell. The light meter includes a pointer 129 which turns to an angular position which is determined by the intensity of the light received by the photocell which energizes the galvanometer. The light meter 128 carries a support 130 located beneath the pointer 129 to support the latter and limit the downward movement thereof, as viewed in FIG. 4. A guide means 131 cooperates with the light meter 128 to prevent the latter from turning about its axis while guiding the latter for vertical movement, and the light meter 128 fixedly carries a threaded stud 132 which is in threaded engagement with a threaded bore of a member 134 which is fixed to a knob 135 at the exterior of the camera. This knob 135 can be manually turned for turning the member 134 about its axis, and the bearing structure 133 supports the member 134 and the knob 135 for turning movement while preventing axial movement thereof. Thus, when the knob 135 is turned so as to place an index in alignment with a selected film speed, corresponding to the speed of the film which is used in the camera, the light meter will be moved vertically to an elevation which will reflect the particular speed of the film which is used in the camera.

The plunger 115 is formed with a pair of vertical slots 137 receiving stationary pins 136 which are fixedly carried by the housing 101, so that in this way the plunger 115 is guided for vertical movement. The spring 140 which acts on the lever 125 also acts through the latter on the plunger 115 to maintain the plunger in its rest position shown in FIG. 4.

The pawl 144 is turnably carried by a pin 143 which is fixedly carried by the plunger 115. A spring 145 is coiled about the pin 143, has one end engaging a projection of the pawl 144 to urge the latter to turn in a clockwise direction, as viewed in FIG. 4, and the other leg of the spring 145 engages a stationary pin carried by the plunger 115. This plunger 115 is provided with a projection 146 which forms a stop limiting the turning of the pawl 144 in a clockwise direction by the spring 145. The pawl 144 has an edge 147 which cooperates with the lug 113 of the ring 104, and in addition the pawl includes a control edge 148 which at the approach of the end of the cocking movement of the structure engages the pin 149 so that the pawl 144 will be turned in opposition to the spring 145 in a counterclockwise direction, as viewed in FIGS. 4 and 5, moving the pawl 144 away from the projection 113 so as to release the ring 104 to the spring 109.

Figure 5:
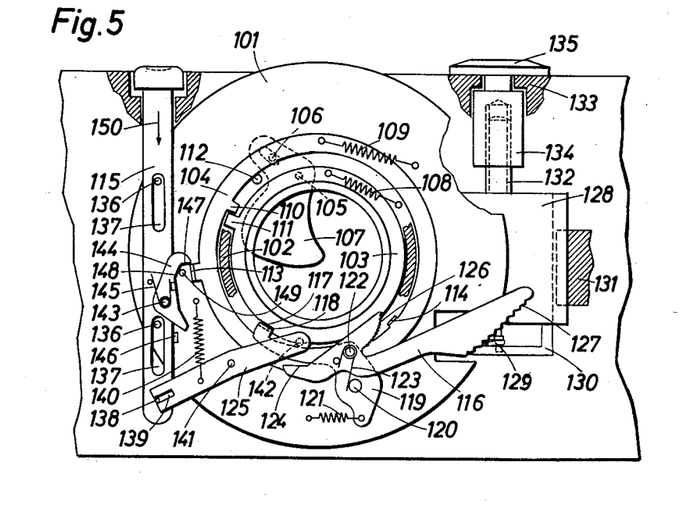
FIG. 5 shows a structure of FIG. 4 in a different position.

As is apparent from the above description, in order to make an exposure the operator depresses the plunger 115 in the direction of the arrow 150 shown in FIG. 5. During this movement of the plunger 115 the edge 147 of the pawl 144 will engage the projection 113 so as to turn the ring 104 and thus through elements 110 and 111 the ring 103 in opposition to the springs 109 and 108, respectively. The parts are shown in FIG. 5 in the position they have just before the instant when the edge 147 leaves the projection 113 so as to release the rings 104 and 103. Thus, when the plunger 115 has been moved slightly beyond the position indicated in FIG. 5, the pawl 144 will no longer engage the projection 113 and the spring 109 will start to turn the ring 104 back toward its rest position. However, it will be noted that at this time the lug 118 has already entered into the notch 117 so that the holding lever means 119 holds the trailing ring 103 against being turned by the spring 108. During the downward movement of the plunger 115 the lever 125 has been turned in opposition to the spring 140 in a counterclockwise direction, as viewed in FIGS. 4 and 5, and thus the pin 142 has moved upwardly away from the edge 124 of the lever 116 which under the influence of the spring 123 turns in a clockwise direction about the pin 122. The edge 124 of the lever 116 follows the pin 142 until the edge portion 127 of the lever 116 engages the pointer 129. The angular position of the pointer 129 will of course be determined by the intensity of the light, so that the engagement of the edge portion 127 of the lever 116 with the pointer 129 will locate lever 116 in an angular position determined by the intensity of the light. The pointer 129 is springy and easily moved, and the downwardly moving edge portion 127 engages the pointer 129 and moves the latter downwardly through a slight distance until it engages the support 130 so that further downward movement of the pointer 129 is prevented. The angular position of the lever 116 determined by the engagement of the edge portion 127 with the pointer 129 will thus locate the edge portion 126 in a predetermined position with respect to the projection 114 of the leading ring 104. Thus, when the plunger 115 has been moved downwardly slightly beyond the position shown in FIG. 5, the pawl 144 will leave the projection 113 and the spring 109 will turn the ring 104 until the projection 114 thereof engages the edge 126. Thus, since the ring 103 is maintained stationary by the holding lever means 119, the turning ring 104 will cause the blades 107 to turn to an open position, and the extent to which the blades move away from their closed position is determined by the engagement of the projection 114 with the edge portion 126 of the lever 116. Thus, the extent to which the blades move away from their closed position, which is to say the size of the exposure aperture, is determined by the cooperation of the light meter structure with the edge portion 127 of the lever 116.

As was the case with the embodiment of FIGS. 1–3, the impact of the projection 114 of the edge portion 126 exerts through the pin 122 a turning moment on the lever 119 which turns the latter in opposition to the spring 121 in counterclockwise direction about the pin 120, so that the projection 118 moves out of the notch 117 and thus releases the trailing ring 103 to the spring 108 to be turned thereby to the position where the projection 111 engages the projection 110 so as to close the blades, and at this time the projection 114 is still in engagement with the edge portion 126. The exposure time is determined with this embodiment in the same way as with the embodiment of FIGS. 1–3 by the distances through which the parts are moved as well as by the residual force of the spring 109 which acts to provide the different speeds of movement of the holding lever 119 according to the force which remains in the spring 109 when the projection 114 engages the edge portion 126.

When the operator releases the plunger 115, the spring 140 will turn the lever 125 in a clockwise direction so as to raise the plunger 115 back toward the position of FIG. 4. The upper end of the pawl 144 at this time can simply engage and ride past the projection 113. The pin 142 of the turning lever 125 engages the edge 124 so as to turn the lever 116 in a counterclockwise direction back toward the position thereof shown in FIG. 4. In this way the pointer 129 of the light meter 128 is released. Also, the turning of the lever 116 back toward the position of FIG. 4 moves the edge portion 126 away from the projection 114 so that the springs 108 and 109 can now turn the rings 103 and 104 back to the rest position without any relative turning between these rings so that the shutter remains closed.

As was pointed out above, the factor of the speed of the film which is used in the camera is taken into consideration by manual turning of the knob 135. This manual turning of knob 135 will control the elevation of the pointer 129 so that the extent to which the lever 116 turns before its edge portion 127 engages the pointer 129 will be more or less depending upon the elevation of the pointer 129, and thus the extent to which the blades 107 are moved is determined in addition to the light intensity also by the particular speed of the film which is placed in the camera.

It will be noted that with this embodiment the relationships graphically illustrated in FIG. 9 also apply.

Of course, instead of making adjustments for film speed by axial movement of the light meter, it is possible to turn the light meter 128 about its axis in a known way in order to also take into account the factor of the speed of the film which is used in the camera.

In the event that it is desired to use the structure of the invention with electronic flash apparatus, there is no particular difficulty. Thus, it is possible, for example, to use the turning of the holding lever means 23 or 119 for the purpose of closing the circuit of the electronic flash at the moment when the size of the exposure aperture is at a maximum. Of course, care must be taken not to close the circuit until the levers 23 or 119 have turned so that their projections 36 or 118 are located in the notches 37 or 117, respectively, but this can easily be taken care of by providing in series with the contacts controlled by the holding levers other contacts which will close switches of the circuit only when the lever 15 or the plunger 115 has turned or moved, respectively, through an angle which is greater than the angle through which these parts turn in order to locate the holding levers in their holding positions.

Figure 6:
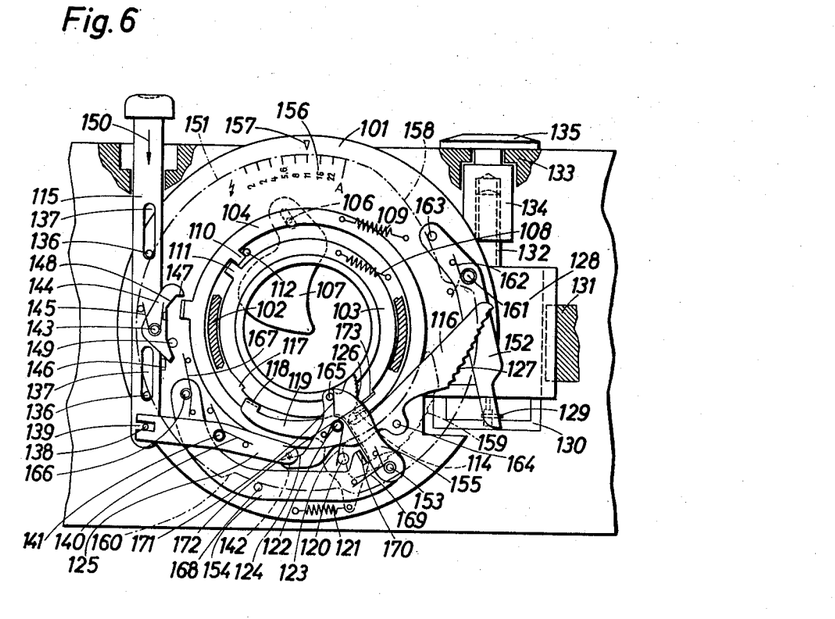
FIG. 6 shows the embodiment of FIGS. 4 and 5 when adapted for use with a camera which can be operated for flash operation.

FIG. 6 illustrates how the embodiment of FIGS. 4 and 5 can be adapted for use with flash operation where a constant exposure time of 1/30 of a second is used with different exposure apertures. FIG. 6 shows an embodiment of the invention capable of setting the structure for automatic operation or for flash operation. The structure is shown in FIG. 6 in its rest position. For the sake of clarity the electrical circuit is not shown in FIG. 6. The above description of the electronic flash apparatus is equally applicable to the flash lamp apparatus used with the structure of FIG. 6.

As may be seen from FIG. 6, all of the elements of FIGS. 4 and 5 are included. In addition, there is a manual operable adjusting means for providing a preselected exposure aperture to be used with the exposure time of 1/30 of a second. This adjusting means takes the form of a manually turnable ring 151 located at the exterior of the structure on the outside housing and diagrammatically illustrated in FIG. 6. In addition to the manually turnable ring 151, a lever 152 is provided for turning the pointer 129 to an inoperative position, and a lever 154 shown at the bottom of FIG. 6 is supported for turning movement by a pin 166 and carries a pivot pin 153 which turnably supports a lever 155. The ring 151 extends into the interior of the assembly and at the exterior of the assembly has a visible scale 156 provided at one end with the graduation A which is aligned with the index 157 to provide for the automatic operation. The other graduations of the scale 156 indicate the various aperture sizes for which the camera will be set when used with the flash apparatus. The index 157 is carried by the housing 101 at the exterior thereof.

The ring 151 is provided with a first camming portion 158 which controls the angular position of the lever 152, with a second camming portion 159 for controlling the angular position of the aperture lever means 116, and with a third camming portion 160 for controlling the position of the lever 154.

The lever 152 is pivotally supported by a stationary pivot pin 161 carried by the housing 101. A spring 162 acts on the lever 152 for urging the latter to turn in a counterclockwise direction, as viewed in FIG. 6, and this lever carries a pin 163 which is thus maintained by the spring 162 in engagement with the camming portion 158 of the ring 151. The configuration of the camming portion 158 is such that when the ring 151 is turned to provide a selected exposure for flash operation the lever 152 will maintain the pointer 129 at all times beyond the path of turning of the lever 116 so that the portion 127 thereof will not cooperate with the pointer 129 at this time.

The camming portion 159 forms the lower edge of a cutout which is formed in the ring 151, and this camming portion 159 cooperates with a pin 164 carried by the lever 116 to determine the angular position thereof. According to the angular position of the ring 151 determined by the operator, a selected step of the camming portion 159 will be located in the path of turning of the pin 164 of the lever 116 so as to determine the angular position of the latter and thus determine the angular position of the edge portion 126 which will thus stop the ring 104 to provide the selected aperture. As was described above in connection with FIGS. 4 and 5, when the plunger 115 is depressed the lever 125 will be turned so that the edge 124 of the lever 116 will follow the pin 142, and with the embodiment of FIG. 6 this operation will take place until the pin 164 engages the camming edge 159. Thereafter the pin 142 will move beyond the edge 124 of the lever 116. Thus, the extent to which projection 114 of the ring 104 will turn before engaging the edge 126 will be determined by the engagement of the pin 164 with the camming edge 159.

The lever 116 is additionally provided with a pin 165 which engages the free end 171 of the lever 155. As was pointed out above, this lever 155 is carried by the pivot pin 153 which is supported by the lever 154, and the spring 169 is coiled about the pivot pin 153 and engages a pair of pins respectively carried by the lever 154 and 155 for urging the latter lever to turn in a counterclockwise direction about the pin 153, as viewed in FIG. 6. The lever 154 itself is urged by the spring 167 coiled about the pivot pin 166 to turn in a counterclockwise direction about the pin 166, as evident from FIG. 6 where the spring 167 is shown coiled about the pin 166 and having one leg engaging a stationary pin and the other leg engaging a pin carried by the lever 154. The lever 154 carries a pin 168 which is thus urged by the spring 167 into engagement with the lower camming portion 160 of the ring 151. It will be noted that the lever 154 has a lug 170 located in the path of turning of the lever 155 by the spring 169 so as to limit the extent to which the lever 155 can turn with respect to the lever 154. The right edge 172 of the lever 155 has a very special curvature illustrated in FIG. 6, and this edge 172 cooperates with a lug 173 extending axially from the ring 103.

In the position of the parts which is illustrated in FIG. 6, the pointer 129 is maintained by the lever 152 beyond the path of turning of the lever 116. The pin 168 of the lever 154 engages the camming edge 160, so that the lever 155 is located between the pin 165 of the lever 116 and the projection 173 of the trailing ring 103. When the plunger 115 is moved downwardly by the operator in the direction of the arrow 150, the structure will be operated in the manner described above in connection with FIGS. 4 and 5. The lever 116 will turn until its pin 164 engages the camming edge 159. During this clockwise turning of the lever 116, the pin 165 thereof will act on the end 171 of the lever 155 to turn the latter in opposition to the weak spring 169 in a clockwise direction, about the pivot 153, and this turning will result in maintaining of the edge 172 of the lever 155 in engagement with the lug 73 even though the ring 103 turns in a counterclockwise direction during the cocking of the structure resulting, from engagement of the pawl 144 with the projection 113. This maintenance of the engagement of the edge 172 with the lug 173 during the simultaneous turning of lever 116 and the ring 103 is brought about by the special curvature of the edge 172. Any inaccuracies in the configuration of the edge 172 will in any event be compensated simply by turning of the lever 154 so as to move the pin 168 thereof away from the camming edge 160 in opposition to the spring 167.

Once the pawl 144 rides off the lug 113 of the ring 104, this latter ring will of course be released to the spring 109 which will turn the ring 104 until the lug 114 thereof engages the edge portion 126 of the lever 116. The ring 103 is of course held at this time by the holding lever 119 whose lug 118 is in the notch 117. The blades 107 therefore move to their open position until the projection 114 engages a step of the edge portion 126. Of course, as was described above, the impact of the lug 114 on the edge portion 126 acts through the pivot pin 122 on the lever 119 to turn the latter in opposition to the spring 121 in a counterclockwise direction moving the lug 118 out of the notch 117 so as to release the ring 103 which now is turned by the spring 108 in a clockwise direction so as to close the blades 107. During this turning of the ring 103 the lug 173 thereof will act on the edge 172 of the lever 155 to turn the latter in a counterclockwise direction about the pin 153. During this turning of the lever 155, the end 171 thereof will act on the pin 165 of the lever 116 to turn the latter in a counterclockwise direction, and in this way the edge portion 126 of the lever 116 is moved away from the lug 114 of the ring 104. Thus, the ring 104 can now be turned by the spring 109 to its rest position where the projection 110 engages the stop 112, and of course the projection 111 remains in engagement with the projection 110, the ring 103 turning together with the ring 104 so that the blades remain in their closed position.

When the manually adjustable means 151 is turned so as to locate the graduation A in alignment with the index 156, the camming portions 158 and 160 act on the levers 152 and 154 so that the lever 155 is moved beyond the pin 165 while engaging the projection 170 of the lever 154, and also at this time the lever 155 is located beyond the lug 173, so that the lever 155 will not in any way interfere with the automatic operation of the lever 116 and the ring 103. Also, the camming edge 158 will turn the lever 152 in a clockwise direction to an angular position where the lever 152 is located beyond the range of turning of the pointer 129 of the light meter which can now cooperate in the manner described above in connection with FIGS. 4 and 5 with the edge portion 127 of the lever 116. Thus, the structure of FIG. 6 can now operate in exactly the same way as was described above in connection with FIGS. 4 and 5. The size of the cutout of the ring 151 whose lower edge forms the cam 159 is such that at this time the pin 164 can turn freely throughout the entire range of turning of the lever 116 without engaging the cam 159.

For optical reasons it may be advisable to use instead of the usual blades, iris shutter blades. With the use of such blades the aperture will at all times have a substantially circular configuration at all sizes of the aperture. Of course, as is well known, the iris shutter blades when in their fully closed position still have a slight opening, and this latter opening is closed by an additional blade as described below in connection with FIGS. 7 and 8. This additional blade is controlled by the same elements which control the iris shutter blades.

Figure 7:
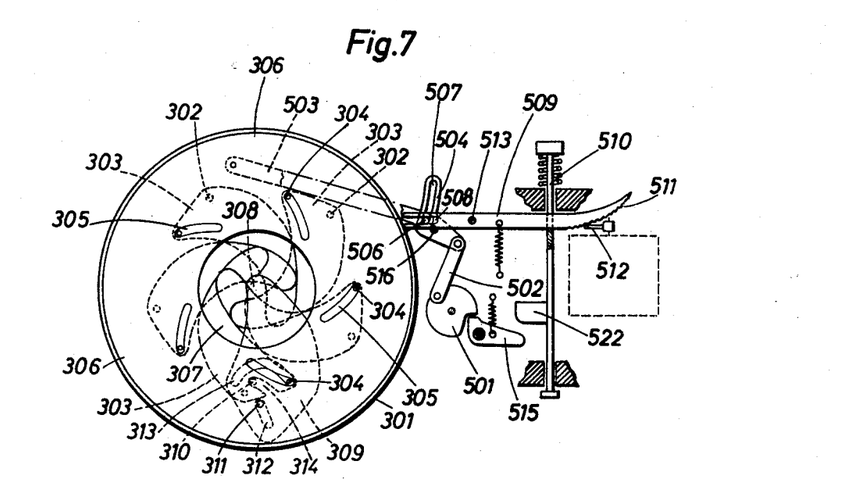
FIG. 7 shows an iris type of shutter which can be operated according to the present invention.
Figure 8:
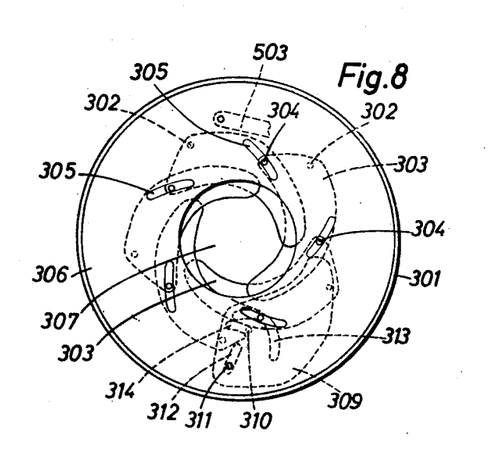
FIG. 8 shows the structure of FIG. 7 in another position.

Referring to FIGS. 7 and 8 which respectively illustrate such a construction in closed and open positions, respectively, it will be seen that the structure includes a ring 306 which is located in front of a ring 301. This ring 301 carries a plurality of pivot pins 302 which respectively support the several iris shutter blades 303 for pivotal movement. In the illustrated example there are five such shutter or iris blades 303. These blades respectively carry pins 304 which respectively extend into the arcuate slots 305 formed in the ring 306. Thus, when the ring 306 is turned from the position of FIG. 7 to that of FIG. 8 with respect to the ring 301, the iris shutter blades 303 will be turned from the closed position of FIG. 7 to the open position of FIG. 8.

The rings 301 and 306 form an opening 307 through which the light reaches the film which is to be exposed. With the iris shutter blades 303 in their fully closed position shown in FIG. 7, there remains a slight opening 308 of substantially pentagonal configuration.

In order to cover this opening 308 an additional blade 309 is provided. The position of the blade 309 is controlled by a pair of pins 310 and 311. The pin 310 is carried by the ring 301 and pivotally supports the blade 309, while the pin 311 is carried by the ring 306. The blade 309 is formed in addition to the bore which receives the pin 310 with an elongated slot 312 which receives the pin 311, and in addition the blade 309 is formed with an arcuate slot 313 through which one of the pins 304 of one of the iris shutter blades extends in the manner shown in FIGS. 7 and 8. The blade which carries the pin 304 extending into the slot 313 of the blade 309 is also formed with a notch 314 to provide clearance for the pin 310.

FIG. 7 illustrates the structure for turning the ring 306 so as to open and close the blades, this structure being identical with structure described below in connection with FIG. 11. However, it is also possible to operate the structure of FIGS. 7 and 8 with the embodiments disclosed in any of the other figures.

Figure 10:
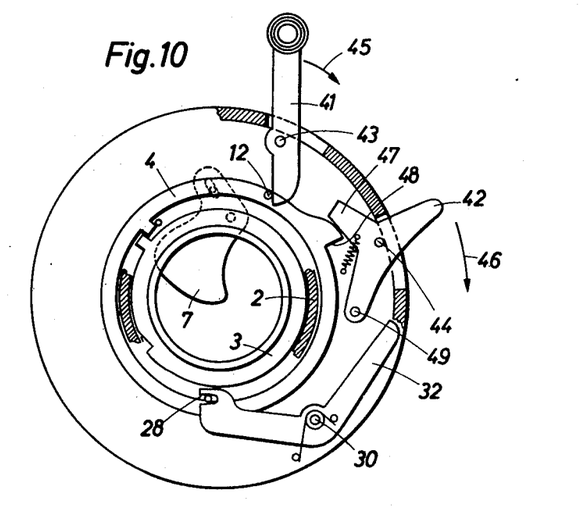
FIG. 10 is a diagrammatic illustration of the invention as used with an arrangement where the shutter is first cocked and then manually released.

FIG. 10 shows a blade and ring means which are operated and controlled in exactly the same way as described above in connection with FIG. 1. However, the structure of FIG. 10, instead of first cocking and then automatically releasing the structure will first manually cock the structure and will maintain the structure cocked until it is manually released. Thus, those parts of FIG. 10 which are identical with that of FIG. 1 are indicated by the same reference characters.

According to the embodiment of FIG. 10, the lever 14 of FIG. 1 is replaced by a cocking lever 41 extending through a slot in the wall of the housing to the exterior thereof so as to be accessible to the operator who can turn the lever 41 in the direction of the arrow 45. In addition to the cocking lever 41, the structure includes a release lever 42 which also extends through a slot to the exterior so as to be accessible to the operator who can turn the lever 42 in the direction of the arrow 46. The housing carries the stationary pins 43 and 44 which respectively pivotally support the levers 41 and 42. During cocking, the lever 41 which is turned in the direction of the arrow 45 engages the pin 12 so as to turn the ring 4 in the same way that the above described lever 14 cooperates with the pin 12 to turn the ring 4. At the end of the cocking movement, the end 47 of the lever 42 moves in front of the projection 48 of the ring 4, so that the ring 4 cannot turn back to its position of rest. As is shown in FIG. 10, a spring is connected to the lever 42 to urge the lever in a counterclockwise direction, as viewed in FIG. 10, so that as soon as the projection 48 moves beyond the projection 47 the latter will move in the path of turning of the projection 48. Now the structure will remain in the cocked position. When the operator wishes to release the structure he turns the lever 42 in the direction of the arrow 46, so as to move the projection 47 away from the projection 48 and now the ring 4 is released and all of the structure operates in the same way as was described above in connection with FIG. 1. Thus, the pin 17 of FIG. 1 corresponds to the pin 49 of FIG. 10.

Figure 11:
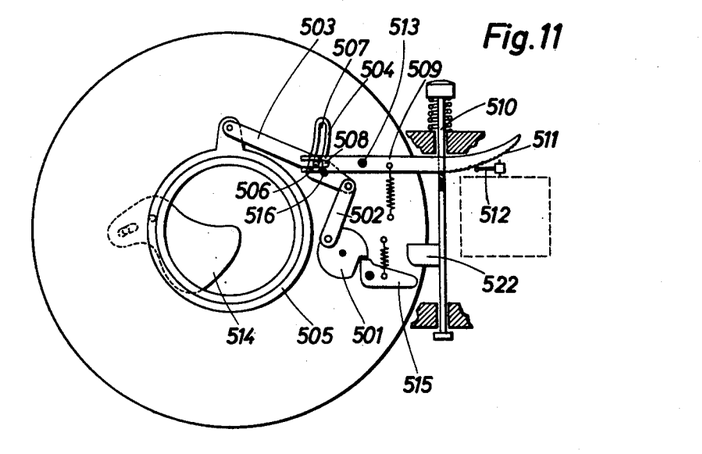
FIG. 11 diagrammatically illustrates the invention as applied to cameras which have crank drives.

FIG. 11 shows an embodiment where the structure of the invention is used with that type of shutter where a drive means drives the shutter operating ring first in one direction to open the shutter and then back in the opposite direction to close the shutter, which in the case of the present invention is a combined shutter and diaphragm. As is shown in FIG. 11, the drive means is in the form of a rotary member 501 driven from an unillustrated spring. The rotary member 501 is pivotally connected to one end of a link 502, and a second link 503 is connected to the shutter operating ring 505. A bell crank lever 504 is pivotally connected to the other end of the lever 502 and acts in a manner described below on the link 503 to actuate the shutter ring 505. The link 503 carries a pin 506 which extends into a slot 507 formed in the lever 504, and by adjusting the position of the pin 506 along the slot 507, it is evident that both the size of the aperture and the exposure time be controlled during each revolution of the shutter driving means 501.

This lever 504 is supported for turning movement by a stationary pin 516. The pin 506 of the link 503 extends through the slot 507 into an elongated notch 508 which is formed in a control lever 509 urged by the spring illustrated in FIG. 11 to turn in a clockwise direction about the stationary pin 513 which supports the lever 509 for turning movement. The structure of FIG. 11 includes a manually operable plunger 510 which is moved downwardly by the operator for the purpose of actuating the combined shutter and diaphragm of the invention, and this plunger 510 has a projection engaged by the lever 509 in the position of the parts shown in FIG. 11, so that the lever 509 cannot turn beyond the position shown in FIG. 11. However, when the plunger 510 is depressed, the lever 509 will turn in a clockwise direction about the pin 513, as viewed in FIG. 11, until the toothed edge portion 511 of the lever 509 engages the pointer 512 of the light meter which is diagrammatically illustrated in FIG. 11. Thus, the angular position of the lever 509 will be determined by the intensity of the light which controls the angular position of the pointer 512, and this angular position of lever 509 will control the position of the pin 506 along the slot 507, so that in this way the light intensity controls the transmission from the drive means 501 to the shutter ring 505 so as to turn the latter to an extent and at a speed which will control the exposure aperture and the exposure time. The rotary drive member 501 is maintained in its rest position as shown in FIG. 11 by the lever 515. When the plunger 510 is depressed, the projection 522 thereof engages the lever 515 to turn the latter in a clockwise direction, as viewed in FIG. 11, so as to release the rotary drive member 501, and when the latter has turned through a complete revolution, the lever 515 has already returned to the position shown in FIG. 11 so as to engage the member 501 and thus stop the turning thereof after one revolution.

Figure 12:
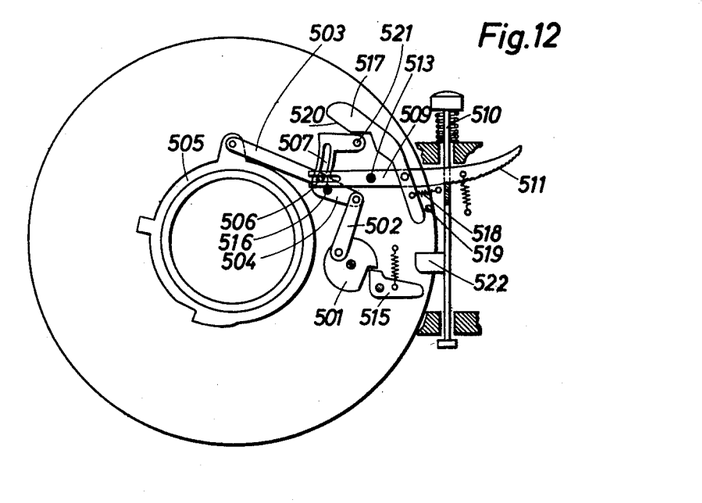
FIG. 12 shows a variation of the structure of FIG. 11 according to which an element is provided for controlling the exposure time.

FIG. 12 illustrates a variation of the embodiment of FIG. 11 according to which additional structure is provided for positively retarding the transmission of the drive from element 501 to element 505 so as to provide longer exposure times with larger exposure apertures. Thus, referring to FIG. 12 it will be seen that this embodiment includes in addition to the above-described structure of FIG. 11 a retarding lever 517 which is pivotally carried by the control lever 509. A spring 518 urges the lever 517 to turn in a counterclockwise direction, and a stop 519 is located in the path of turning of the lever 517 to limit the extent to which the latter is turned by the spring 518. The lever 517 is provided with an edge portion 520 which will be located to a greater or lesser extent in the path of turning of the pin 521 carried by the lever 504, depending upon the angle through which the lever 509 turns before its edge 511 engages the pointer 512. Thus, the angular position of the lever 509 will determine the extent to which the edge portion 520 of the lever 517 engages the pin 521 to retard the transmission of the motion from the drive means 501 to the ring 505, and in this way the provision of longer exposure times with larger exposure apertures is guaranteed. Thus, this embodiment will provide for each exposure aperture a given exposure time, and the exposure times and exposure apertures vary directly with each other.

It will be understood that each of the elements described above, or two or more together, may also find a useful application in other types of cameras differing from the types described above.

While the invention has been illustrated and described as embodied in shutter-diaphragm assembly for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, blade means located substantially in a plane normal to the optical axis; leading ring means and trailing ring means both coaxial with said optical axis and both cooperating with said blade means when said leading and trailing ring means have a predetermined angular position with respect to each other for maintaining said blade means in a closed position preventing an exposure and said leading and trailing ring means moving said blade means to an open position providing an exposure when said leading and trailing ring means are angularly displaced one with respect to the other; spring means cooperating with said leading and trailing ring means for maintaining the latter in predetermined rest positions, respectively, when said blade means is in said closed position; manually operable means cooperating with said leading and trailing ring means for moving the same in opposition to said spring means to a cocked position and for then releasing said leading and trailing ring means for movement back to said rest positions thereof; holding lever means cooperating with said trailing ring means for preventing return thereof to said rest position when said manually operable means releases both of said ring means so that only said leading ring means is moved by said spring means back toward said rest position, whereby said blade means is actuated to be moved from said closed position thereof to an open position providing an exposure; a projection carried by said leading ring means; aperture lever means located in the path of movement of said projection for engaging the latter and stopping the turning of said leading ring means by said spring means at a position which will provide a predetermined exposure aperture; and means connecting said aperture lever means to said holding lever means for moving the latter from its position holding said trailing ring means when said projection engages said aperture lever means so as to release said trailing ring means for movement by said spring means back to the angular position with respect to said leading ring means which both of said ring means have with respect to each other when they are in said rest position thereof, so that the movement of said holding lever means away from said trailing ring means upon engagement of said projection with said aperture lever means effects the movement of said blade means back to said closed position thereof to terminate the exposure.

2. In a camera, in combination, blade means located substantially in a plane normal to the optical axis; leading ring means and trailing ring means both coaxial with said optical axis and both cooperating with said blade means when said leading and trailing ring means have a predetermined angular position with respect to each other for maintaining said blade means in a closed position preventing an exposure and said leading and trailing ring means moving said blade means to an open position providing an exposure when said leading and trailing ring means are angularly displaced one with respect to the other; spring means cooperating with said leading and trailing ring means for maintaining the latter in predetermined rest positions, respectively, when said blade means is in said closed position; manually operable means cooperating with said leading and trailing ring means for moving the same in opposition to said spring means to a cocked position and for then releasing said leading and trailing ring means for movement back to said rest positions thereof; holding lever means cooperating with said trailing ring means for preventing return thereof to said rest position when said manually operable means releases both of said ring means so that only said leading ring means is moved by said spring means back toward said rest position, whereby said blade means is actuated to be moved from said closed position thereof to an open position providing an exposure; a projection carried by said leading ring means; aperture lever means located in the path of movement of said projection for engaging the latter and stopping the turning of said leading ring means by said spring means at a position which will provide a predetermined exposure aperture; and means connecting said aperture lever means to said holding lever means for moving the latter from its position holding said trailing ring means when said projection engages said aperture lever means so as to release said trailing ring means for movement by said spring means back to the angular position with respect to said leading ring means which both of said ring means have with respect to each other when they are in said rest position thereof, so that the movement of said holding lever means away from said trailing ring means upon engagement of said projection with said aperture lever means effects the movement of said blade means back to said closed position thereof to terminate the exposure, said spring means having upon engagement of said projection with said aperture lever means a residual energy which moves said holding lever means away from said trailing ring means with a speed determined by the extent of turning of said projection before engagement with said aperture lever means, so that at different positions of said aperture lever means providing different extents of opening of said blade means said holding lever means will be moved from its holding position with different speeds, respectively.

3. In a camera, in combination, blade means located substantially in a plane normal to the optical axis; leading ring means and trailing ring means both coaxial with said optical axis and both cooperating with said blade means when said leading and trailing ring means have a predetermined angular position with respect to each other for maintaining said blade means in a closed position preventing an exposure and said leading and trailing ring means moving said blade means to an open position providing an exposure when said leading and trailing ring means are angularly displaced one with respect to the other; spring means cooperating with said leading and trailing ring means for maintaining the latter in predetermined rest positions, respectively, when said blade means is in said closed position; manually operable means cooperating with said leading and trailing ring means for moving the same in opposition to said spring means to a cocked position and for then releasing said leading and trailing ring means for movement back to said rest positions thereof; holding lever means cooperating with said trailing ring means for preventing return thereof to said rest position when said manually operable means releases both of said ring means so that only said leading ring means is moved by said spring means back toward said rest position, whereby said blade means is actuated to be moved from said closed position thereof to an open position providing an exposure; a projection carried by said leading ring means; aperture lever means located in the path of movement of said projection for engaging the latter and stopping the turning of said leading ring means by said spring means at a position which will provide a predetermined exposure aperture; and means connecting said aperture lever means to said holding lever means for moving the latter from its position holding said trailing ring means when said projection engages said aperture lever means so as to release said trailing ring means for movement by said spring means back to the angular position with respect to said leading ring means which both of said ring means have with respect to each other when they are in said rest position thereof, so that the movement of said holding lever means away from said trailing ring means upon engagement of said projection with said aperture lever means effects the movement of said blade means back to said closed position thereof to terminate the exposure, said holding lever means being supported for turning movement about a predetermined axis and said aperture lever means being pivotally carried by said holding lever means for turning movement with respect to the latter about an axis spaced from the pivot axis of said holder lever means and providing upon engagement of said projection with said aperture lever means a turning moment which turns said holding lever means away from its position preventing turning of said trailing ring means by said spring means while said aperture lever means blocks further turning of said leading ring means.

4. In a camera, in combination, blade means located substantially in a plane normal to the optical axis; leading ring means and trailing ring means both coaxial with said optical axis and both cooperating with said blade means when said leading and trailing ring means have a predetermined angular position with respect to each other for maintaining said blade means in a closed position preventing an exposure and said leading and trailing ring means moving said blade means to an open position providing an exposure when said leading and trailing ring means are angularly displaced one with respect to the other; spring means cooperating with said leading and trailing ring means for maintaining the latter in predetermined rest positions, respectively, when said blade means is in said closed position; manually operable means cooperating with said leading and trailing ring means for moving the same in opposition to said spring means to a cocked position and for then releasing said leading and trailing ring means for movement back to said rest positions thereof; holding lever means cooperating with said trailing ring means for preventing return thereof to said rest position when said manually operable means releases both of said ring means so that only said leading ring means is moved by said spring means back toward said rest position, whereby said blade means is actuated to be moved from said closed position thereof to an open position providing an exposure; a projection carried by said leading ring means; aperture lever means located in the path of movement of said projection for engaging the latter and stopping the turning of said leading ring means by said spring means at a position which will provide a predetermined exposure aperture; means connecting said aperture lever means to said holding lever means for moving the latter from its position holding said trailing ring means when said projection engages said aperture lever means so as to release said trailing ring means for movement by said spring means back to the angular position with respect to said leading ring means which both of said ring means have with respect to each other when they are in said rest position thereof, so that the movement of said holding lever means away from said trailing ring means upon engagement of said projection with said aperture lever means effects the movement of said blade means back to said closed position thereof to terminate the exposure, said aperture lever means having a stepped edge portion located in the path of turning of said projection; and means cooperating with said aperture lever means for locating in the path of movement of said projection a step of said stepped edge portion which will provide a predetermined aperture upon engagement of said projection with said aperture lever means.

5. In a camera, in combination, blade means located substantially in a plane normal to the optical axis; leading ring means and trailing ring means both co-axial with said optical axis and both cooperating with said blade means when said leading and trailing ring means have a predetermined angular position with respect to each other for maintaining said blade means in a closed position preventing an exposure and said leading and trailing ring means moving said blade means to an open position providing an exposure when said leading and trailing ring means are angularly displaced one with respect to the other; spring means cooperating with said leading and trailing ring means for maintaining the latter in predetermined rest positions, respectively, when said blade means is in said closed position; manually operable means cooperating with said leading and trailing ring means for moving the same in opposition to said spring means to a cocked position and for then releasing said leading and trailing ring means for movement back to said rest positions thereof; holding lever means cooperating with said trailing ring means for preventing return thereof to said rest position when said manually operable means releases both of said ring means so that only said leading ring means is moved by said spring means back toward said rest position, whereby said blade means is actuated to be moved from said closed position thereof to an open position providing an exposure; a projection carried by said leading ring means; aperture lever means located in the path of movement of said projection for engaging the latter and stopping the turning of said leading ring means by said spring means at a position which will provide a predetermined exposure aperture; means connecting said aperture lever means to said holding lever means for moving the latter from its position holding said trailing ring means when said projection engages said aperture lever means so as to release said trailing ring means for movement by said spring means back to the angular position with respect to said leading ring means which both of said ring means have with respect to each other when they are in said rest position thereof, so that the movement of said holding lever means away from said trailing ring means upon engagement of said projection with said aperture lever means effects the movement of said blade means back to said closed position thereof to terminate the exposure; light meter means having a pointer whose angular position is determined by light intensity, said aperture lever means having a control edge portion which engages said pointer to determine the position of said aperture lever means and thus determine when said projection will be engaged by said aperture lever means so as to control the extent to which said blade means move away from their closed position.

6. In a camera, in combination, blade means located substantially in a plane normal to the optical axis; leading ring means and trailing ring means both co-axial with said optical axis and both cooperating with said blade means when said leading and trailing ring means have a predetermined angular position with respect to each other for maintaining said blade means in a closed position preventing an exposure and said leading and trailing ring means moving said blade means to an open position providing an exposure when said leading and trailing ring means are angularly displaced one with respect to the other; spring means cooperating with said leading and trailing ring means for maintaining the latter in predetermined rest positions, respectively, when said blade means is in said closed position; manually operable means cooperating with said leading and trailing ring means for moving the same in opposition to said spring means to a cocked position and for then releasing said leading and trailing ring means for movement back to said rest positions thereof; holding lever means cooperating with said trailing ring means for preventing return thereof to said rest position when said manually operable means releases both of said ring means so that only said leading ring means is moved by said spring means back toward said rest position, whereby said blade means is actuated to be moved from said closed position thereof to an open position providing an exposure; a projection carried by said leading ring means; aperture lever means located in the path of movement of said projection for engaging the latter and stopping the turning of said leading ring means by said spring means at a position which will provide a predetermined exposure aperture; means connecting said aperture lever means to said holding lever means for moving the latter from its position holding said trailing ring means when said projection engages said aperture lever means so as to release said trailing ring means for movement by said spring means back to the angular position with respect to said leading ring means which both of said ring means have with respect to each other when they are in said rest position thereof, so that the movement of said holding lever means away from said trailing ring means upon engagement of said projection with said aperture lever means effects the movement of said blade means back to said closed position thereof to terminate the exposure; light meter means having a pointer whose angular position is determined by light intensity, said aperture lever means having a control edge portion which engages said pointer to determine the position of said aperture lever means and thus determine when said projection will be engaged by said aperture lever means so as to control the extent to which said blade means move away from their closed position; aperture adjusting means for adjusting the exposure aperture when the camera is operated with flash illumination, said aperture adjusting means having a first camming portion and a second camming portion; lever means cooperating with said first camming portion of said aperture adjusting means and said pointer of said light meter for moving said pointer to an inoperative position located beyond the path of movement of said aperture lever means when said aperture adjusting means is actuated to provide a selected aperture when the camera is operated under flash illumination, said aperture lever means then cooperating with said second camming portion for stopping said projection at a point determined by the setting of said aperture adjusting means.

7. In a camera, in combination, blade means located substantially in a plane normal to the optical axis; leading ring means and trailing ring means both coaxial with said optical axis and both cooperating with said blade means when said leading and trailing ring means have a predetermined angular position with respect to each other for maintaining said blade means in a closed position preventing an exposure and said leading and trailing ring means moving said blade means to an open position providing an exposure when said leading and trailing ring means are angularly displaced one with respect to the other; spring means cooperating with said leading and trailing ring means for maintaining the latter in predetermined rest positions, respectively, when said blade means is in said closed position; manually operable means cooperating with said leading and trailing ring means for moving the same in opposition to said spring means to a cocked position and for then releasing said leading and trailing ring means for movement back to said rest positions thereof; holding lever means cooperating with said trailing ring means for preventing return thereof to said rest position when said manually operable means releases both of said ring means so that only said leading ring means is moved by said spring means back toward said rest position, whereby said blade means is actuated to be moved from said closed position thereof to an open position providing an exposure; a projection carried by said leading ring means; aperture lever means located in the path of movement of said projection for engaging the latter and stopping the turning of said leading ring means by said spring means at a position which will provide a predetermined exposure aperture; means connecting said aperture lever means to said holding lever means for moving the latter from its position holding said trailing ring means when said projection engages said aperture lever means so as to release said trailing ring means for movement by said spring means back to the angular position with respect to said leading ring means which both of said ring means have with respect to each other when they are in said rest position thereof, so that the movement of said holding lever means away from said trailing ring means upon engagement of said projection with said aperture lever means effects the movement of said blade means back to said closed position thereof to terminate the exposure; light meter means having a pointer whose angular position is determined by the light intensity, said aperture lever means having a control edge portion which engages said pointer to determine the position of said aperture lever means and thus determine when said projection will be engaged by said aperture lever means so as to control the extent to which said blade means move away from their closed position; aperture adjusting means for adjusting the exposure aperture when the camera is operated with flash illumination, said aperture adjusting means having a first camming portion and a second camming portion; lever means cooperating with said first camming portion of said aperture adjusting means and said pointer of said light meter for moving said pointer to an inoperative position located beyond the path of movement of said aperture lever means when said aperture adjusting means is actuated to provide a selected aperture when the camera is operated under flash illumination, said aperture lever means then cooperating with said second camming portion for stopping said projection at a point determined by the setting of said aperture adjusting means; and additional lever means cooperating with said aperture adjusting means and with said aperture lever means for controlling the exposure time when the camera is set for flash operation.

8. In a camera, in combination, a blade assembly located substantially in a plane normal to the optical axis of the camera; blade moving means movable between open and closed positions and cooperating with said blade assembly for moving the latter from a closed position preventing an exposure to an open position providing an exposure and then back to said closed position, during in the open position of said blade moving means a closed position to said open position thereof and then back to said closed position thereof, respectively; adjustable lever means cooperating with said blade moving means for controlling the extent to which said blade moving means moves said blade assembly from said closed position thereof so as to determine the aperture provided by said blade assembly, said adjustable lever means having in the open position of said blade moving means a position temporarily holding said blade moving means at said open position thereof; and spring means of a predetermined force operatively connected to one of said means for urging said blade moving means to said closed position thereof and said adjustable lever means from said position temporarily holding said blade moving means in said open position thereof, said spring means expending a relatively large proportion of said predetermined force thereof in moving said blade moving means and said blade assembly when a relatively large aperture is provided by said blade assembly so that the remaining force of said spring means is relatively small and thus the blade moving means and lever means move at a relatively slow rate to provide a relatively long exposure time while a relatively small portion of said predetermined force of said spring means is expended in moving said blade moving means and said blade assembly when said blade assembly provides a relatively small aperture so that a relatively large proportion of said predetermined force of said spring means remains for moving said blade moving means and lever means quickly to provide a relatively short exposure time, whereby exposure times which vary directly with the size of the aperture are automatically provided and a retarding mechanism is rendered superfluous, while said blade assembly performs the functions of a diaphragm and shutter.

9. In a camera as recited in claim 8, said blade assembly including a plurality of iris shutter blades and an additional blade closing the opening which remains when said iris shutter blades are in their closed position, said blade moving means including a ring means coaxial with said optical axis and cooperating with said iris shutter blades and additional blade for controlling the movement of all of said blades to move the same from a closed position preventing an exposure to an open position providing an exposure and then back to said closed position.

10. In a camera as recited in claim 8, said blade moving means including ring means cooperating with said blade assembly for moving the latter from a closed to an open position when said ring means turns in one direction and for moving said blade means from said open to said closed position when said ring means turns at an opposite direction, said adjustable lever means including a first link pivotally connected at one end to said ring means, rotary drive means, a second link pivotally connected at one end to said rotary drive means, and control lever means located between and pivotally connected with said first and second links, said control lever means cooperating with said links for controlling the extent to which said blades are opened and the duration during which said blades remained open and according with the setting of said control lever means.

11. In a camera as recited in claim 10, light meter means cooperating with said control lever means for automatically setting the latter to regulate the operation of said ring means by said drive means in accordance with the light intensity.

12. In a camera as recited in claim 11, delay lever means cooperating with said control lever means for retarding the turning thereof by said drive means for controlling the exposure time.

13. In a camera as recited in claim 8, said adjustable lever means being adjustable with respect to its effective length and controlling the extent to which said blade moving means opens said blade assembly according to the effective length of said adjustable lever means.

14. In a camera as recited in claim 8, said spring means and adjustable lever means providing for predetermined values of light intensity predetermined combinations of exposure aperture and exposure time.

15. In a camera, in combination, a blade assembly located substantially in a plane normal to the optical axis of the camera; rotary ring means concentrically surrounding said optical axis and movable between open and closed positions, said ring means cooperating with said blade assembly for moving the latter from a closed position preventing an exposure to an open position providing an exposure and then back to said closed position during movement of said ring means from said closed to said open position thereof and then back to said closed position thereof, respectively; adjustable lever means cooperating with said ring means for controlling the extent to which said ring means moves said blade assembly from said closed position thereof so as to determine the aperture provided by said blade assembly, said adjustable lever means having in the open position of said ring means a position temporarily holding said ring means at said open position thereof; and spring means of a predetermined force operatively connected to one of said means for urging said ring means to said closed position thereof and said lever means from said position temporarily holding said ring means in said open position thereof, said spring means expending a relatively large portion of said predetermined force thereof in moving said ring means and blade assembly to provide a relatively large aperture so that the remaining portion of said predetermined force of said spring means moves said lever means and ring means at a relatively slow rate providing automatically a relatively long exposure time when said blade assembly provides a relatively large aperture and said spring means expending a relatively small proportion of said predetermined force thereof when said blade assembly provides a relatively small aperture so that a relatively large proportion of said predetermined force of said spring means remains for moving said ring means and lever means quickly to provide automatically a relatively short exposure time with a relatively small aperture, whereby said spring means provides automatically exposure times which vary directly with the size of the aperture provided by said blade assembly so as to render a retarding mechanism superfluous and whereby said blade assembly performs the functions of a diaphragm and shutter.

References Cited by the Examiner
UNITED STATES PATENTS

| 761,756 | 6/04 | Brueck | 95—63 |
| 798,595 | 9/05 | Brueck | 95—63 |
| 2,999,438 | 9/61 | Nerwin | 95—64 X |
| 2,999,439 | 9/61 | Nerwin | 95—64 X |
| 2,999,440 | 9/61 | Nerwin | 95—64 X |

NORTON ANSHER, *Primary Examiner.*

E. E. FULLER, DELBERT B. LOWE, EMIL G. ANDERSON, *Examiners.*